United States Patent
Conroy et al.

(10) Patent No.: US 8,972,797 B2
(45) Date of Patent: Mar. 3, 2015

(54) SYSTEM AND METHOD FOR APPLICATION DEBUGGING

(71) Applicant: General Electric Company, Schenectady, NY (US)

(72) Inventors: Patrick Joseph Conroy, Roanoke, VA (US); Richard William Shaw, Salem, VA (US); Christina Ann Romanik, Salem, VA (US)

(73) Assignee: General Electric Company, Schenectady, NY (US)

( * ) Notice: Subject to any disclaimer, the term of this patent is extended or adjusted under 35 U.S.C. 154(b) by 218 days.

(21) Appl. No.: 13/647,342

(22) Filed: Oct. 8, 2012

(65) Prior Publication Data

US 2014/0101488 A1 Apr. 10, 2014

(51) Int. Cl.
*G06F 11/00* (2006.01)
(52) U.S. Cl.
USPC .......................................... 714/46; 714/38.1
(58) Field of Classification Search
CPC ... G06F 11/36; G06F 11/3612; G06F 11/362; G06F 11/3648; G06F 11/3656; G06F 11/3664
USPC .................. 714/38.1, 38.13, 46, 47.1, 48, 57; 717/124, 125, 127
See application file for complete search history.

(56) References Cited

U.S. PATENT DOCUMENTS

| | | | |
|---|---|---|---|
| 5,815,653 A * | 9/1998 | You et al. .................. 714/38.13 |
| 6,834,388 B1 * | 12/2004 | Elsbree ......................... 719/316 |
| 7,111,281 B2 * | 9/2006 | Bates et al. ..................... 717/129 |
| 7,849,445 B2 * | 12/2010 | Tran .............................. 717/124 |
| 7,949,905 B2 * | 5/2011 | Sharma et al. .................. 714/49 |
| 2007/0168997 A1 * | 7/2007 | Tran .............................. 717/129 |
| 2009/0210071 A1 * | 8/2009 | Agrusa et al. ..................... 700/9 |
| 2009/0210814 A1 | 8/2009 | Agrusa et al. |
| 2010/0031167 A1 * | 2/2010 | Roytman ....................... 715/760 |
| 2010/0306313 A1 * | 12/2010 | Mahnke ........................ 709/203 |
| 2011/0035792 A1 * | 2/2011 | Leitner .............................. 726/8 |

* cited by examiner

*Primary Examiner* — Scott Baderman
*Assistant Examiner* — Joseph Kudirka
(74) *Attorney, Agent, or Firm* — Fletcher Yoder, P.C.

(57) ABSTRACT

A system includes a client system comprising a memory and a processor configured to execute a debugging tool. The debugging tool is communicatively coupled to an OPC Unified Architecture (UA) server. Furthermore, the debugging tool is configured to monitor and control, from the client system, debugging of an application executing on the OPC UA server.

18 Claims, 5 Drawing Sheets

US 8,972,797 B2

SYSTEM AND METHOD FOR APPLICATION DEBUGGING

BACKGROUND

The subject matter disclosed herein relates to Level 2 Supervisory Control Platforms (L2SCPs) and Object Linking and Embedding for Process Control Unified Architecture (OPC UA) servers and, more specifically, monitoring and debugging applications for L2SCPs and OPC UA servers.

Certain systems, such as industrial automation systems, may include capabilities that enable control and monitoring of the system. For example, an industrial automation system may include controllers, field devices, and sensors storing monitoring data for subsequent analysis. Furthermore, such industrial automation systems may include a Level 2 Supervisory Control Platform (L2SCPs) to provide a platform for hosting systems and applications (e.g., an OPC Unified Architecture (UA) server and various other applications). That is, the L2SCP may generally provide a framework to interconnect various components of the industrial automation system to various services and applications of the L2SCP (e.g., OPC UA and/or other applications) based on a service-oriented architecture (SOA).

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes a client system comprising a memory and a processor configured to execute a debugging tool. The debugging tool is communicatively coupled to an OPC UA server. Furthermore, the debugging tool is configured to monitor and control, from the client system, debugging of an application executing on the OPC UA server.

In another embodiment, a method includes instructing, from a client system, a Level 2 Supervisory Control Platform (L2SCP) server to execute and debug a L2SCP application based on one or more received selections. The method also includes receiving, at the client system, output from the L2SCP server regarding the execution and debugging of the L2SCP application, wherein the output comprises event details and variable values related to the execution and debugging of the L2SCP application. The method further includes displaying and storing, at the client system, the received output from the execution and debugging of the L2SCP application.

In another embodiment, a tangible, non-transitory, computer-readable medium stores a plurality of instructions executable by a processor of an electronic device. The instructions include instructions to present a user interface of a debugging tool, wherein the user interface is configured to receive selections for use in debugging an application. Further, the application is configured to be debugged by an OPC UA server of a Level 2 Supervisory Control Platform (L2SCP) server based on the selections. The instructions also include instructions to instruct the OPC UA server, using a modified OPC UA protocol, to debug the application. The modified OPC UA protocol includes debugging extensions and is configured to enable communication between the debugging tool and the OPC UA server. The instructions further include instructions to receive from the OPC UA server, using the modified OPC UA protocol, output related to the debugging of the application. The instructions also include instructions to display the received output related to the debugging of the application via the user interface of the debugging tool.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
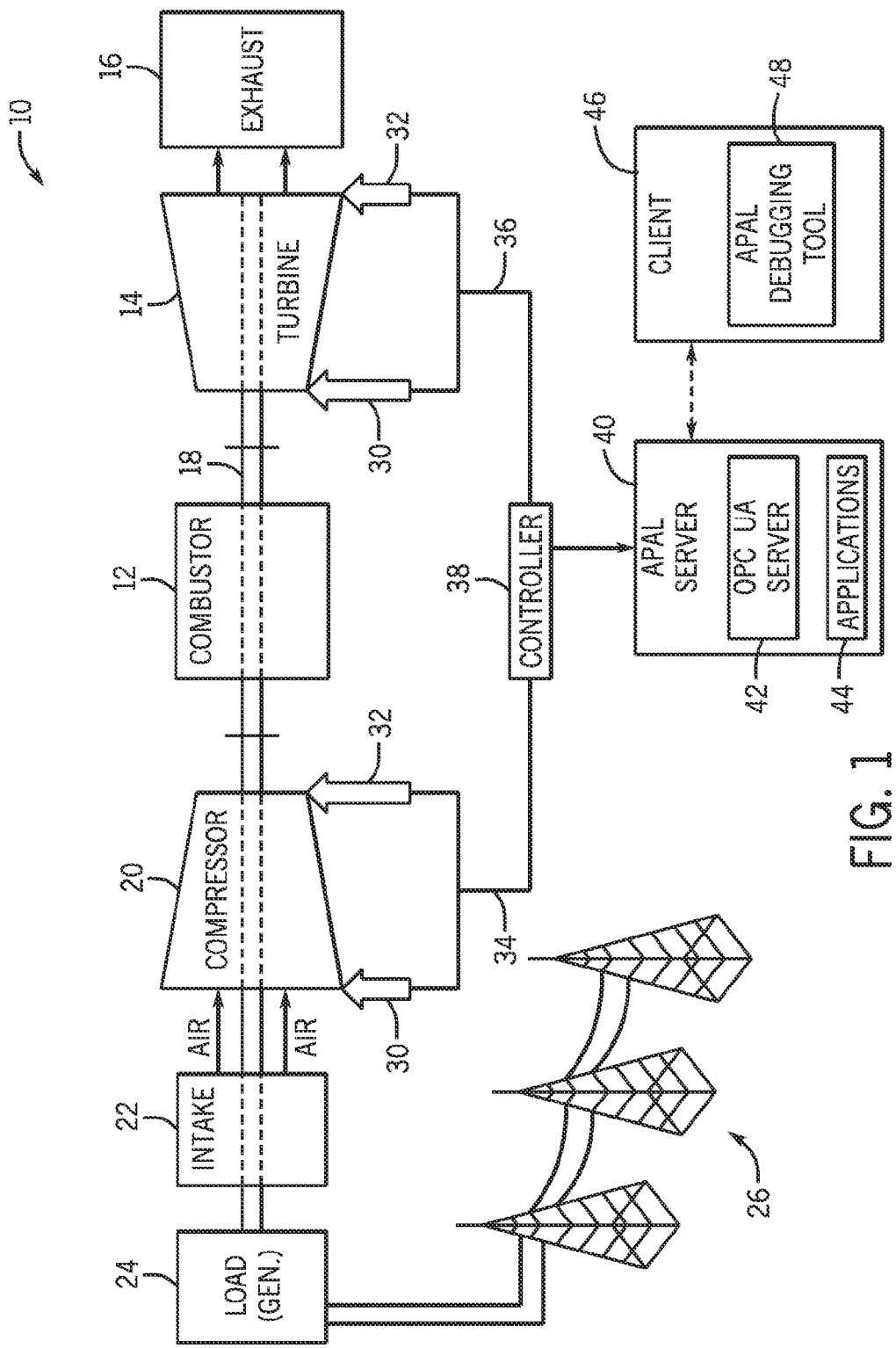
FIG. 1 is a block diagram of an industrial control system, including a controller, an APAL server, and a client, in accordance with an embodiment of the present approach.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. The term "debug," as used herein, refers to a controlled execution of a set of instructions, such that the execution of the instructions (e.g., the values of variables, which instructions are executed, and so forth) may be monitored and/or controlled. The term "method," as used herein, may refer to a set of instructions (e.g., a software method or computer-implemented method) that may be executed by a processor of an electronic device.

As mentioned, a Level 2 Supervisory Control Platform (L2SCP) may generally provide a framework to interconnect various components of an industrial automation system to various services and applications. For example, the L2SCP may be an Advanced Plant Application Layer (APAL) server. It should be appreciated that while the discussion below may be directed toward an APAL server as an example of a L2SCP server, any L2SCP server may benefit from the present approach. As such, the features discussed below that are associated with the APAL server (e.g., the APAL server, APAL applications, the APAL debugging tool, and so forth) may be similarly implemented using any suitable L2SCP framework (e.g., to provide L2SCP debugging functionality for one or more L2SCP applications executing on a L2SCP server), as set forth below.

Accordingly, as a specific example of a L2SCP, an APAL server may store and execute instructions (e.g., software applications, software methods, software modules, and so forth) to control and monitor the operation of various components of the associated industrial automation system. An APAL server may host, for example, an OPC UA server in addition to other applications for controlling and monitoring the operation of the industrial automation system. OPC UA is a protocol for manufacturer-independent communication used in industrial automation systems (e.g., automated power generation systems and automated manufacturing systems) that is specified by the OPC Foundation. Furthermore, during operation, the instructions executed by the APAL server (e.g., an application being executed by the OPC UA server of an APAL server) may, at times, produce error conditions. As a result of this error condition, the APAL server may be unable to complete execution of at least a portion of the application. As such, the APAL server may have access to information regarding error conditions experienced by APAL applications.

Further, an operator executing applications on the APAL server (or other suitable L2SCP) may not directly interface with (e.g., may not have physical access to and/or may be disposed in a separate location from) the APAL server. That is, rather than directly interfacing with the APAL server, other machines (e.g., a client system) may store and execute instructions (e.g., software applications, software methods, software modules, and so forth) to provide a user interface whereby an operator may interface with the APAL server (e.g., an OPC UA server hosted on the APAL server). For example, a client system may host ToolboxST™ (a trademark of General Electric Co., available from General Electric Co., of Schenectady, N.Y.) to interface with the OPC UA and/or APAL servers. Accordingly, the operator may rely on ToolboxST™, or a similar suitable program, to monitor and control the APAL and/or OPC UA servers from a client system.

As such, from a traditional client system (e.g., ToolboxST™ executing on the client system), the operator may have little or no access to information regarding error conditions encountered by various applications executing on the APAL server. In other words, without having direct access to the internal components (e.g., the memories and processors) of the APAL server, it may be difficult for an operator to determine the underlying cause(s) of error conditions encountered by the applications executing on the APAL server from the client system. Furthermore, since an operator may not have software expertise, even having access to the details of the circumstance that resulted in the error condition, an operator may not be able to derive any useful information to correct or prevent the error condition from occurring.

Accordingly, the presently disclosed APAL debugging tool provides a user interface (e.g., executed on a client system) whereby an operator may select a number of parameters (e.g., variables, methods, and so forth) of an APAL application (e.g., disposed on the APAL server) to monitor and/or control when debugging the application. Further, the parameters may be defined by the programmer of the APAL application during application development using the disclosed normalized debugger application programming interface (API). Accordingly, present embodiments provide an APAL debugging tool that an operator with only a basic understanding of software debugging may use to monitor and control the execution of various applications on the APAL server from a client system during a debugging process. As such, using the presently disclosed APAL debugging tool, the operator need not be intimately familiar with the internal parameters of the APAL application in order to debug the APAL application.

With the foregoing in mind, FIG. 1 illustrates a gas turbine system 10 as an example embodiment of an industrial automation system that incorporates techniques disclosed herein. As depicted, the turbine system 10 may include a combustor 12, which may receive a fuel/air mixture for combustion. This combustion creates hot, pressurized exhaust gases, which the combustor 12 directs through a turbine 14 (e.g., part of a rotor) and toward an exhaust outlet 16. As the exhaust gases pass through the turbine 14, the resulting forces cause the turbine blades to rotate a drive shaft 18 along an axis of the turbine system 10. As illustrated, the drive shaft 18 is connected to various components of the turbine system 10, including a compressor 20.

The drive shaft 18 may include one or more shafts that may be, for example, concentrically aligned. The drive shaft 18 may include a shaft connecting the turbine 14 to the compressor 20 to form a rotor. The compressor 20 may include blades coupled to the drive shaft 18. Thus, rotation of turbine blades in the turbine 14 may cause the shaft connecting the turbine 14 to the compressor 20 to rotate the blades within the compressor 20. The rotation of blades in the compressor 20 compresses air that is received via an air intake 22. The compressed air is fed to the combustor 12 and mixed with fuel to allow for higher efficiency combustion. The shaft 18 may also be connected to a load 24, which may be a vehicle or a stationary load, such as an electrical generator in a power plant or a propeller on an aircraft. When the load 24 is an electrical generator, the electrical generator may be coupled to a power grid 26 for distributing electrical power to, for example, residential and commercial users.

The turbine system 10 may also include a plurality of sensors and field devices configured to monitor a plurality of engine parameters related to the operation and performance of the turbine system 10. The sensors and field devices may include, for example, inlet sensors and field devices 30 and outlet sensors and field devices 32 positioned adjacent to, for example, the inlet and outlet portions of the turbine 14, and the compressor 20, respectively. The inlet sensors and field devices 30 and outlet sensors and field devices 32 may measure, for example, environmental conditions, such as ambient temperature and ambient pressure, as well as a plurality of engine parameters related to the operation and performance of the turbine system 10, such as, exhaust gas temperature, rotor speed, engine temperature, engine pressure, gas temperature, engine fuel flow, exhaust flow, vibration, clearance between rotating and stationary components, compressor discharge pressure, pollution (e.g., nitrogen oxides, sulfur oxides, carbon oxides and/or particulate count), and turbine exhaust pressure. Further, the sensors and field devices 30 and 32 may also measure actuator information such as valve position, and a geometry position of variable geometry components (e.g., air inlet).

The plurality of sensors and field devices 30 and 32 may also be configured to monitor engine parameters related to various operational phases of the turbine system 10. Measurements taken by the plurality of sensors and field devices 30 and 32 may be transmitted via module lines 34 and 36, which may be communicatively coupled to a controller 38. The controller 38 may use the measurements to actively control the turbine system 10. Further, the controller 38 and/or the sensors and field devices 30 and 32 may communicate with and store the measurements (i.e., operational parameters of the industrial automation system 10) in a suitable L2SCP (e.g., APAL Server 40), hosting an OPC UA server 42, as discussed in detail below. For example, module line 34 may be utilized to transmit measurements from the compressor 20, while module line 36 may be utilized to transmit measurements from the turbine 14.

It should be appreciated that other sensors may be used, including combustor 12 sensors, exhaust 16 sensors, intake 22 sensors, and load 24 sensors. Likewise, any type of field devices may be used, including "smart" field devices such as Fieldbus Foundation, Profibus, and/or Hart field devices. It is also to be appreciated that the gas turbine system 10 is only an example embodiment of an industrial automation system, and that other industrial automation systems may include, for example, automated power generation systems, such as gas turbines, steam turbines, wind turbines, or hydroturbines, heat recovery steam generators (HRSG), a power generator, fuel skids, gas processing systems, gasification systems, or any other automated power generation system or partially-automated power generation system. Other industrial automation systems may include automated manufacturing systems such as chemical plants, pharmaceutical plants, oil refineries, automated production lines or similar automated or partially-automated manufacturing system.

As illustrated in FIG. 1, the APAL server 40, hosting the OPC UA server 42 and other applications 44, is communicatively coupled to the controller 38 such that it may send instructions and/or receive data (e.g., operational parameters) from the controller 38 regarding the operation of the industrial automation system 10. The illustrated gas turbine system 10 further includes a client system 46 communicatively coupled to the APAL server 40 (e.g., OPC UA 42 and/or applications 44). The client system 46 may execute a number of applications (e.g., ToolboxST™) to allow an operator to generally control the operation of the APAL server 40 (e.g., OPC UA 42 and/or applications 44).

The operational parameters of the industrial automation system 10 monitored and/or controlled by the APAL server 40 (e.g., OPC UA server 42 and/or applications 44) may include, for example, information regarding the status (e.g., functional, operational, malfunctioning, or similar status), the performance (e.g., the power output, revolutions per minute, load, or similar performance parameter), the environmental conditions (e.g., temperature, pressure, voltage, current, present or levels of a particular analyte, or similar environmental condition), and so forth, which may be generally tracked by the controller 38 for the industrial automation system 10. In certain embodiments, the APAL server 40 may reside on-site (i.e., with the gas turbine system 10) or may be coupled to the controller 38 via a network connection from another location. Furthermore, in certain embodiments, the client system 46 may reside on-site or may be coupled to the APAL server 40 from another location.

The applications 44 illustrated in FIG. 1 may include compiled code (e.g., binary executables from instructions written in C, C++, C#, Matlab, or other suitable language) and/or interpreted code (e.g., Java byte-code) that may be executed by one or more processors of the APAL server 40. Furthermore, as mentioned above, when an APAL server 40 (e.g., the OPC UA server 42) is executing one of the applications 44, the application may experience an error condition. For example, an application may fail to receive a piece of data (e.g., a communication error), fail to perform a calculation (e.g., an illegal operation error, such as a divide-by-zero error or an out-of-range error), fail to access a particular resource (e.g., a privilege or security error), or fail interpret the instructions (e.g., a file corruption error). Further, the APAL server 40 (e.g., OPC UA 42) may have access to information regarding error conditions experienced by the APAL applications 44. The illustrated client system 46 includes an APAL debugging tool 48. The APAL debugging tool 48 includes a set of instructions (e.g., software applications, modules, user interfaces, and so forth) that may be executed by the client system 46 to enable the operator to debug the applications 44 executing on the APAL server 40.

Figure 2:
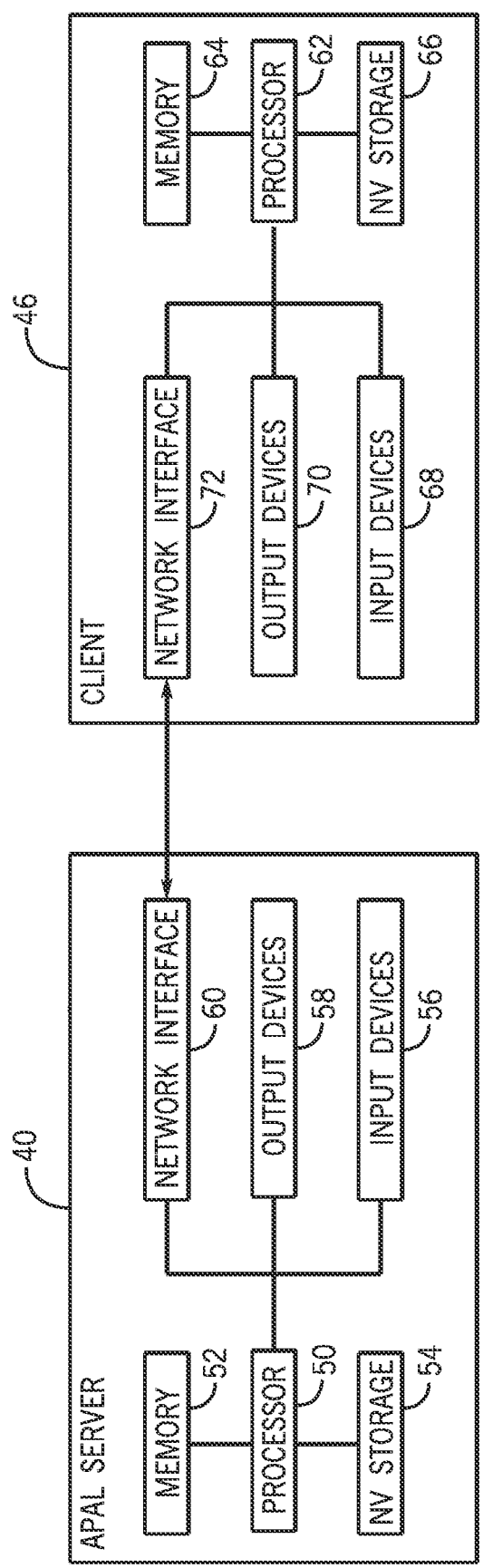
FIG. 2 is a block diagram illustrating certain internal components of the APAL server and the client of FIG. 1, in accordance with an embodiment of the present approach.

FIG. 2 illustrates certain hardware components of the APAL server 40 and the client system 46 illustrated in FIG. 1, in accordance with an embodiment of the present approach. As mentioned, in other embodiments, the APAL server 40 may be any suitable L2SCP server. Further, as mentioned, the illustrated APAL server 40 and the client system 46 may cooperate to allow an operator to use the client system 46 (e.g., the APAL debugging tool 48 executing on the client system 46) to debug the applications 44 disposed on the APAL server 40. As such, the APAL server 40 illustrated in FIG. 2 includes a processor 50 (e.g., any suitable microprocessor), memory 52 (e.g., random access memory (RAM) or other suitable short-term memory), as well as nonvolatile (NV) storage 54 (e.g., a hard drive, flash drive, solid-state disk (SSD), or other suitable long-term storage). The memory 52 and/or the NV storage 54 may store sets of instructions for applications (e.g., OPC UA server 42 and applications 44) for execution by the processor 50. Furthermore, the illustrated APAL server 40 includes input devices 56 (e.g., mice, keyboards, touchpads, touchscreens, or other suitable input devices) and output devices 58 (e.g., monitors, speakers, liquid crystal displays (LCDs), or other suitable output devices) to facilitate use of the APAL server 40. Additionally, the illustrated APAL server 40 includes a network interface 60 (e.g., Ethernet cards, wireless network cards, or similar networking devices) to facilitate communication with the client system 46 and/or other systems. In other embodiments, the APAL server 40 may include additional network interfaces 60 (e.g., to interface with the controller 38 illustrated in FIG. 1).

Like the APAL server 40, the client system 46 illustrated in FIG. 2 includes a processor 62 (e.g., any suitable microprocessor), memory 64 (e.g., random access memory (RAM) or other suitable short-term memory), as well as nonvolatile (NV) storage 66 (e.g., a hard drive, flash drive, solid-state disk (SSD), or other suitable long-term storage). The memory 64 and/or the NV storage 66 may store sets of instructions for applications (e.g., ToolboxST™ and the APAL debugging tool 48) for execution by the processor 62. Furthermore, the illustrated client system 46 includes input devices 68 (e.g., mice, keyboards, touchpads, touchscreens, or other suitable input devices) and output devices 70 (e.g., monitors, speakers, liquid crystal displays (LCDs), or other suitable output devices) to facilitate use of the client system 46 by an operator. Additionally, the illustrated client system 46 includes a network interface 72 (e.g., Ethernet cards, wireless network cards, or similar networking devices) to facilitate communication with the APAL server 40 and/or other systems.

Figure 3:
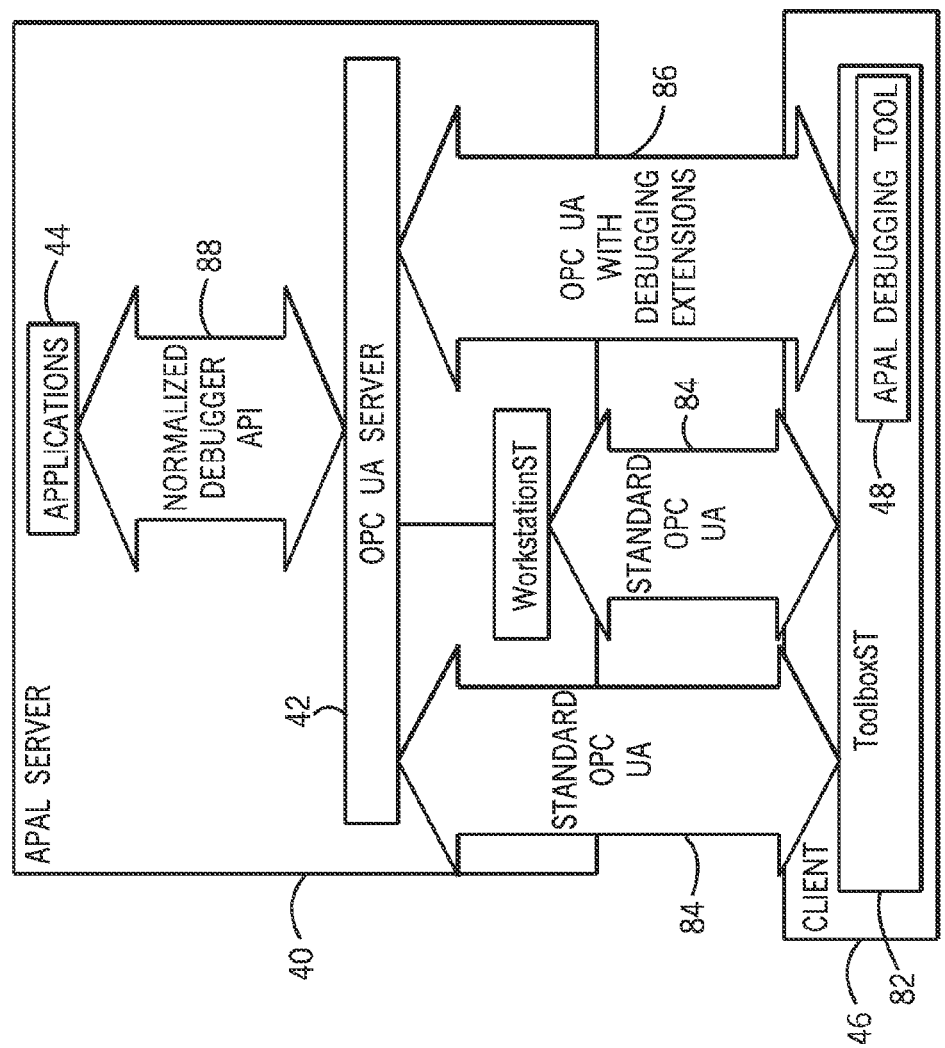
FIG. 3 is a block diagram illustrating communication between components of the APAL server and the client of FIG. 1, in accordance with an embodiment of the present approach.

FIG. 3 illustrates communication between various applications executing on the APAL server 40 (e.g., processor 50) and the client system 46 (e.g., processor 62), in accordance with an embodiment of the present approach. As mentioned, in other embodiments, the APAL server 40 may be any suitable L2SCP server. As illustrated in FIG. 3, the APAL server 40 hosts (e.g., executes using the processor 50) the OPC UA server 42, which hosts applications 44 to monitor and control the operation of an industrial automation system (e.g., the gas turbine system 10 illustrated in FIG. 1). Furthermore, the APAL server 40 illustrated in FIG. 3 also hosts (e.g., executes using the processor 50 or another suitable processor) WorkstationST™ 80 (a trademark of General Electric Co., available from General Electric Co., of Schenectady, N.Y.), which may interface with the OPC UA server 42. In certain embodiments, WorkstationST™ 80 may reside on a separate system that is communicatively coupled to the APAL server 40 and the client system 46. Furthermore, in certain embodiments, the OPC UA server 42 and/or the applications 44 may be executed within a particular container/platform (e.g., Apache ServiceMix) of the APAL server 40.

The client system 46 illustrated in FIG. 3 hosts (e.g., executes using the processor 62) ToolboxST™ 82, which may provide an operator with a collection of user interfaces to control the operation of the WorkstationST™ 80, OPC UA server 42, and/or the APAL server 40. For the embodiment illustrated in FIG. 3, ToolboxST™ 82 includes the APAL debugging tool 48 (e.g., a L2SCP debugging tool), which may specifically provide a user interface whereby an operator may debug the application 44 hosted by the APAL server 40. Furthermore, as illustrated, the ToolboxST™ 82 and the WorkstationST™ 80, as well as the ToolboxST™ 82 and the OPC UA server 42, may communicate with one another using a standard OPC UA protocol 84.

In contrast, the APAL debugging tool 48 illustrated in FIG. 3 communicates with the OPC UA server 42 using a modified OPC UA protocol 86 that includes debugging extensions. That is, the standard OPC UA protocol 84 utilized by ToolboxST™ 82 to communicate with WorkstationST™ 80 and/or OPC UA server 42 may not include a framework for exchanging debugging information. Accordingly, both the APAL debugging tool 48 and the OPC UA server 42 may support a modified OPC UA protocol 86, which allows the client system 46 and the OPC UA server 42 to exchange debugging instructions (e.g., instructions to begin or halt the debugging process) and debugging information (e.g., variable values, events, error messages, and so forth) when debugging an application 44.

Furthermore, the applications 44 illustrated in FIG. 3 interface with the OPC UA server 42 using a normalized debugger API 88. That is, when a programmer is developing an application 44 for execution on the APAL server 40 (e.g., on the OPC UA server 42), the programmer may utilize one or more features of the normalized debugger API 88 to define parameters of the application 44 for later debugging using the APAL debugging tool 48. It should be appreciated that, for the normalized debugger API 88, "normalized" may generally refer to the ability of the debugger API 88 to serve as a common, unifying API that may be used by (e.g., implemented by) a number of different applications 44 to provide a common debugging framework. For example, in certain embodiments, the normalized debugger API 88 may include sets of instructions in the form of one or more libraries defining mechanisms (e.g., variables, methods, and so forth) that the programmer may utilize to make certain parameters (e.g., variables, methods, and so forth) of the application 44 available for operator debugging. By specific example, in certain embodiments, the normalized debugger API 88 may provide an interface (e.g., a Java interface that may be implemented by the application 44) defining a collection of methods for accessing information regarding the variables, methods, and events of the application 44 when executing during the debugging process.

By specific example, the normalized debugger API 88 may include a set of instructions, such as a Get_Available_Variables method, that returns an array of variable objects, each variable object having properties (e.g., a plain-text name, plain-text description, unit, value, reasonable range, and so forth) describing each variables of the application 44 that may be monitored during the debugging process. By further example, the normalized debugger API 88 may include a set of instructions, such as a Get_Methods method, that returns an array of method objects, each method object having properties (e.g., a plain-text name, a plain-text description, activated or deactivated status, and so forth) describing methods of the application 44 that may be controlled by the APAL debugging tool 48 during the debugging process. Further, the normalized debugger API 88 may define methods, for example, for retrieving the identities and/or values of monitored variables of the application 44; methods for retrieving the identities, input parameters, or output values for certain methods of the application 44; methods to invoke certain methods of the application 44; methods to retrieve event log entries corresponding to the execution of the application 44; methods to clear event log entries corresponding to the execution of the application 44; and/or other suitable methods. Furthermore, the normalized debugger API 88 may also define events, such as a new event log item event that occurs when a new item is added to an event log for an application 44. Accordingly, once the application 44 has been developed by the programmer using the normalized debugger API 88, the application 44 may include all of the appropriate variables, methods, events, and so forth, for use in debugging the application 44.

Figure 4:
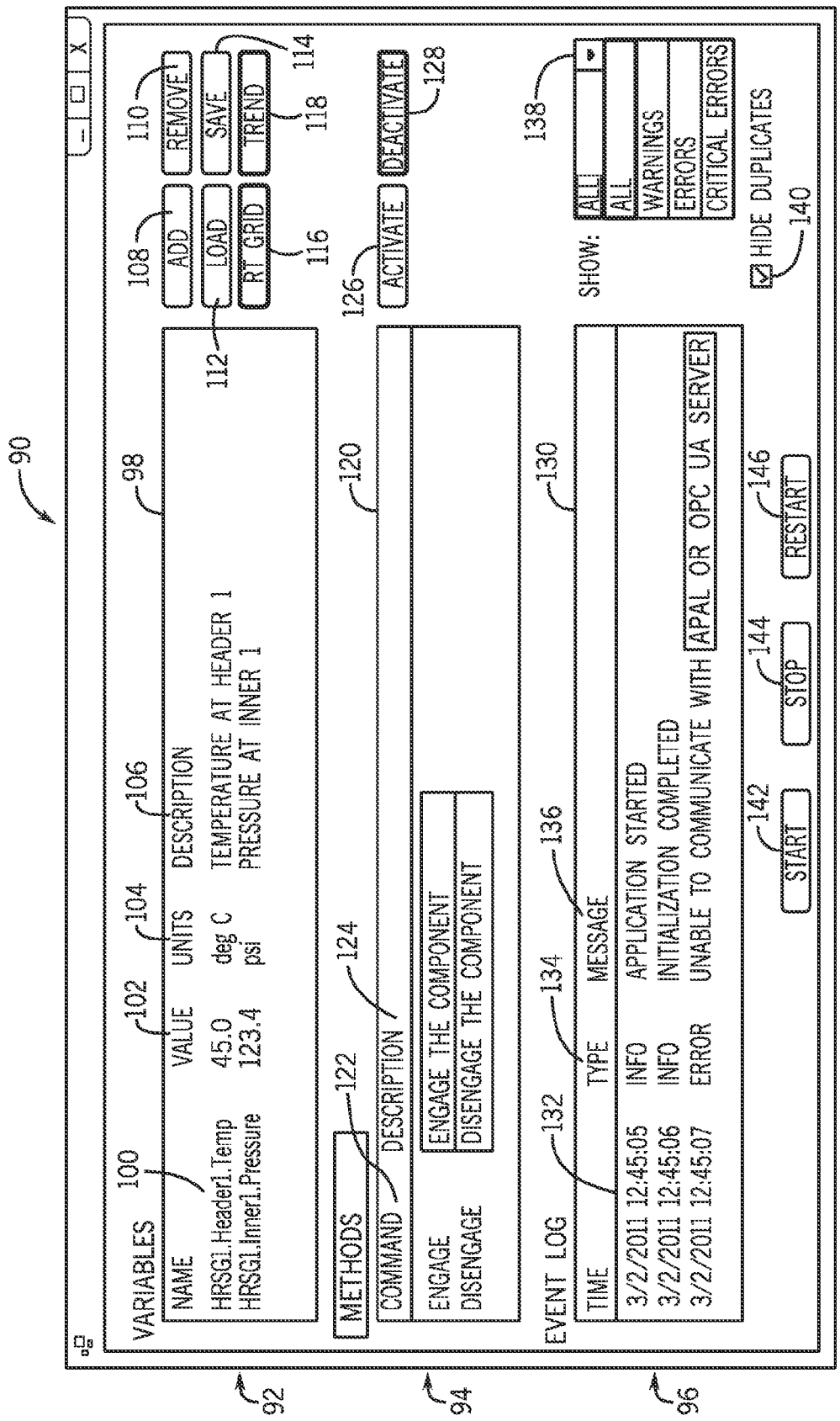
FIG. 4 is a simulated screenshot of a user interface of the APAL debugging tool illustrated FIGS. 1 and 3, in accordance with an embodiment of the present approach.

FIG. 4 illustrates a simulated screenshot of an embodiment of a user interface 90 of the APAL debugging tool 48 (e.g., a L2SCP debugging tool) that an operator may use to debug an application 44 (e.g., a L2SCP application) executing on the APAL server 40 and/or OPC UA server 42 (e.g., a L2SCP server), in accordance with an embodiment of the present approach. It should be appreciated that, in other embodiments, the user interface 90 may be part of (e.g., a tab or panel of) a larger user interface (e.g., a user interface of ToolboxST™ 82). The illustrated user interface 90 includes three main sections: a variables section 92, a methods section 94, and an event log section 96. Further, the operator may largely utilize the sections 92 and 94 to set up the parameters of the debugging operations, while the event log section 96 may generally be used to display events encountered by the application 44 during execution.

The variables section 92 of the user interface 90 illustrated in FIG. 4 includes a table 98 having columns displaying a name 100, value 102, unit 104, and description 106 for a number of variables of an application 44 being monitored during the debugging process. It should be appreciated that the information the user interface 90 (e.g., table 98) may be provided by one or more methods defined in the normalized debugging API 88 (e.g., the Get_Variables and Get_Methods methods discussed above). As such, upon selecting the add button 108, an operator may be presented with a list (e.g., a pop-up window that includes all of the variables of the application 44 that the programmer set up for debugging using the normalized debugging API 88) such that the operator may select additional variables to add to the table 98 to be monitored during execution of the application 44. Further, the operator may select a particular variable from the table 98 and, subsequently, utilize the remove button 110 to remove the selected variable from the table 98 such that it is no longer monitored during the debugging process.

Additionally, the variable section 92 illustrated in FIG. 4 includes load button 112 and save button 114 that may be used to manage the debugging data associated with the monitored variables listed in table 98. For example, in certain embodiments, an operator may utilize the save button 114 to save to a file (e.g., stored in memory 64 or NV storage 66 of the client system 46) with the information regarding the monitored variables presented in table 98. Further, in certain embodiments, the operator may utilize the load button 112 to select a file (e.g., stored in memory 64 or NV storage 66 of the client system 46) that may include a preselected list of variables of the application 44 that the operator desires to monitor during the debugging process. It should be appreciated that the load button 112 and the save button 114 generally allows the operator to organize the monitored variables of the application 44 into sets that may be saved to (and retrieved from) a local file. Furthermore, in certain embodiments, the save button 114 may also allow the export of the contents of the table 98 in other formats (e.g., as a spreadsheet or document) for further analysis or use.

Furthermore, in certain embodiments, the variable section 92 of the user interface 90 illustrated in FIG. 4 may include additional features for monitoring and presenting the values of the variables during the debugging process. For example, the illustrated user interface 90 includes a real-time (RT) grid button 116. That is, in certain embodiments, the value displayed in the value column 102 of the table 98 may be a final value of the variable (e.g., upon completion or halting of the debugging process). However, in certain situations, it may be desirable to track the values of the variables listed in table 98 in substantially real-time (e.g., during or throughout the execution and debugging of the application 44). Accordingly, upon selecting the RT grid button 116, the operator may be presented with a table similar to the table 98, but the value displayed for each variable may represent a current value of the variable at that point during the execution and debugging of the application 44. Further, in certain embodiments, the user interface 90 may include a trend button 118. Upon selecting the trend button 118, the operator may be presented with one or more charts or graphs demonstrating changes in the value of a variable over the course of the execution of the application 44. For example, if an integer variable is selected in the table 98 and the operator selects the trend button 118, the operator may be presented with a graph (e.g., a trendline plot) that demonstrates all of the different values the integer variable is set to throughout the execution and debugging of the application 44.

The user interface 90 illustrated in FIG. 4 further includes a method section 94. The method section 94 includes a table 120 that lists each method of the application 44 that has been defined by the programmer of the application 44 (using the normalized debugger API 88) for debugging by the APAL debugging tool 48. Accordingly, each method illustrated in table 120 includes a command 122 (e.g., a verb describing the action of the method) and a description 124 (e.g., a plain-text description of what the method does) that may be defined by the programmer during development. An operator may select a method from the table 120 and may subsequently select either the activate button 126 or the deactivate button 128 to enable or disable the selected method, respectively, during the execution and debugging of the application 44. Further, in certain embodiments, the appearance of a method in the table 120 may be visually distinguished (e.g., using color, shading, transparency, or similar visual effect) from the other methods when it is in an activated or deactivated state. Additionally, in certain embodiments, upon selecting to activate a particular method (e.g., using the activate button 126), the operator may be presented with a prompt to provide one or more parameters to the method in order to afford the operator with greater control over the behavior of the application 44 during the debugging process. Further, it should be appreciated that, in certain embodiments, the APAL debugging tool 48 may verify an operator's and/or client system's security credentials (e.g., username and password, certificates, and/or other suitable credentials) before allowing the operator to activate or deactivate a particular method.

The event log section 96 of the user interface 90 illustrated in FIG. 4 includes a table 130 that presents an event time 132 (e.g., a time stamp), an event type 134 (e.g., information, warning, error, critical error, and so forth), and an event message 136 for a number of events encountered during the execution and debugging of the application 44. Like the variables in the variable section 92 and the methods of the method section 94, the information presented in the event log table 130 (e.g., the event type 134 and the event message 136) may be built into the application 44 by the programmer using the normalized debugger API 88. Further, the event log section 96 also includes a select box 138 to allow the operator to filter events listed in the event log table 132 to include only a particular type of event (e.g., warnings, errors, critical errors, and so forth). Additionally, the event log section 96 may also include a user input 140 that the operator may select to prevent the display of duplicate event log entries in the event log table 130.

Accordingly, the user interface 190 may be used by the operator to select particular variables to monitor (e.g., using the variable section 92) and to select a particular method to activate or deactivate (e.g., using the method section 94), as set forth above. Subsequently, the operator may select the start button 142 to begin execution and debugging of the application 44, causing the event log table 130 to be populated with events encountered by the application 44 during execution. Further, during execution of the application 44, the operator may select the stop button 144 in order to halt the execution and debugging process. Additionally, after completing or halting execution and debugging of the application 44, the operator may select the restart button 146 to restart the execution and debugging of the application 44 using the operator's selections in section 92 and 94 of the user interface 90. It should be appreciated that, in certain embodiments, the APAL debugging tool 48 may verify an operator's credentials (e.g., username and password, certificates, and/or other suitable credentials) before allowing the operator to use the APAL debugging tool 48 and/or begin the debugging process (e.g., using the start button 142).

Figure 5:
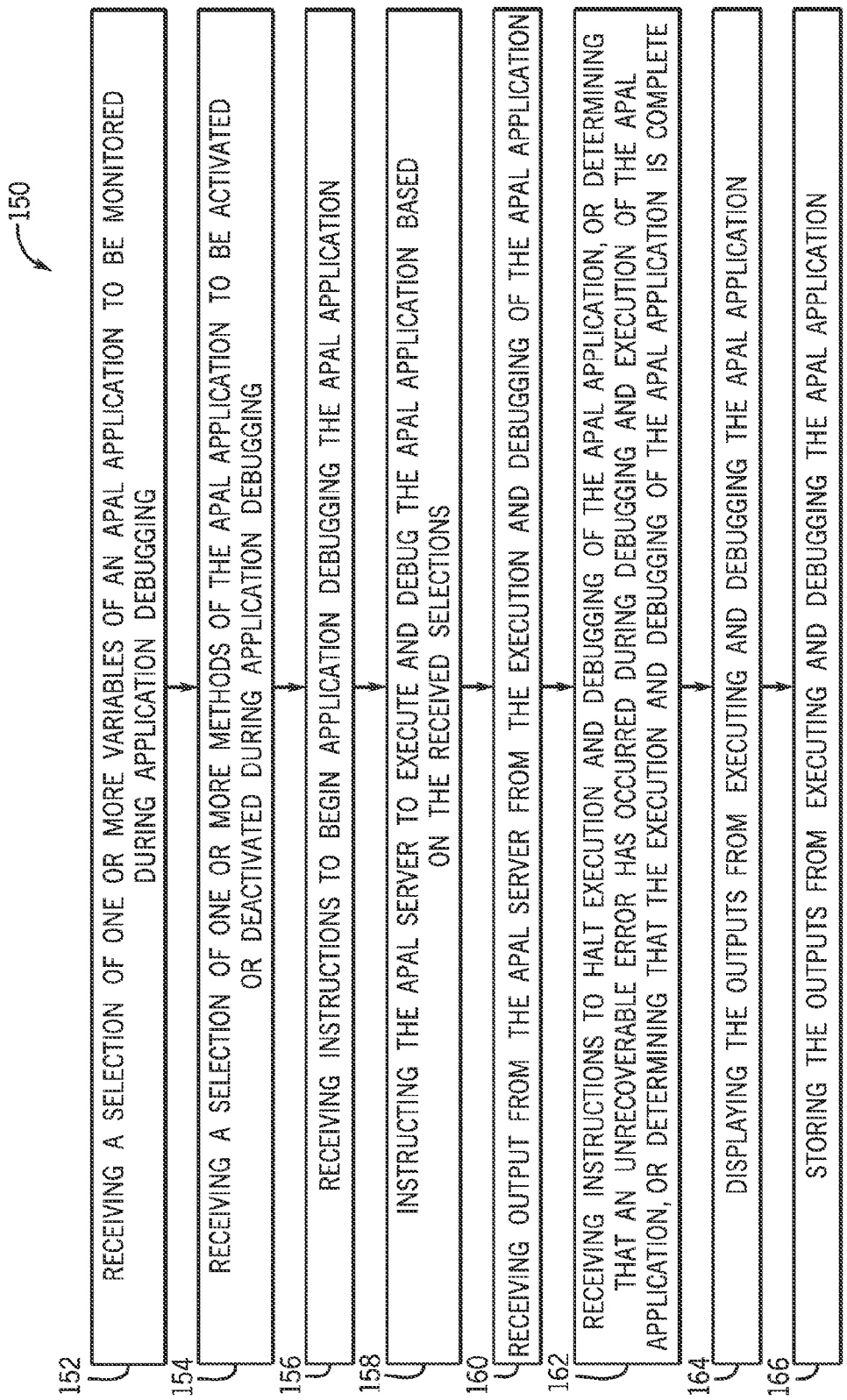
FIG. 5 is a flow diagram illustrating a process by which an APAL application maybe debugged using the APAL debugging tool, in accordance with an embodiment of the present approach.

FIG. 5 illustrates a process 150 whereby the APAL debugging tool 48 (e.g., a L2SCP debugging tool) may control and monitor debugging of an application 44 (e.g., a L2SCP application) on the APAL server 40 and/or OPC UA server 42 (e.g., a L2SCP server), in accordance with an embodiment of the present approach. It should be appreciated that, in certain embodiments, certain steps illustrated in the process 150 may be performed in other orders or may be skipped altogether. The illustrated process 150 begins with the APAL debugging tool 48 receiving (block 152) a selection of one or more variables of the APAL application 44 to be monitored during application debugging. For example, in certain embodiments, an operator may use the variable section 92 of the user interface 90 illustrated in FIG. 4 to add, remove, and/or load variables to be monitored during application debugging. The illustrated process 150 also includes the APAL debugging tool 48 receiving (block 154) a selection of one or more methods of the APAL application 44 to be activated or deactivated during application debugging. For example, in certain embodiments, an operator may use the method section 94 of the user interface 90 illustrated in FIG. 4 to activate and/or deactivate particular methods for use during application debugging.

The process 150 illustrated in FIG. 5 continues with the APAL debugging tool 48 receiving (block 156) instructions to begin debugging of the APAL application. In turn, the APAL debugging tool 48 may instruct (block 158) the APAL server 40 to execute and debug the APAL application 44 based on the received selections (e.g., from blocks 152 and/or 154). Subsequently, the APAL debugging tool 48 may receive (block 160) output from the APAL server 40 from the execution and debugging of the APAL application 44. Furthermore, the APAL debugging tool 48 may continue to receive execution and debugging output from the APAL server 40 until at least one of three conditions is met. As illustrated in block 162 of the process 150, the APAL debugging tool 48 may stop waiting for debugging output (e.g., from the APAL server 40) upon receiving instructions to halt execution and debugging of the APAL application (e.g., if an operator utilizes the stop button 144 of the user interface 90 illustrated in FIG. 4). In certain embodiments, upon receiving instructions to halt the debugging process, the APAL debugging tool 48 may further instruct the APAL server 42 to halt execution and debugging of the application 44. Further, the APAL debugging tool 48 may also stop waiting for debugging output upon determining that an unrecoverable error (e.g., a critical error) has occurred during the execution of the APAL application 44. For example, the APAL debugging tool 48 may receive debugging output from the APAL server 40 indicating that execution of the application 44 cannot continue as a result of an error condition (e.g., a failure to connect to the APAL server). Additionally, the APAL debugging tool 48 may also stop waiting for debugging output upon determining that the execution and debugging of the APAL application 44 is complete. For example, the APAL debugging tool 48 may receive debugging output from the APAL server 40 indicating that execution and debugging of the application 44 is complete.

Once the APAL debugging tool 48 has received the debugging output from the APAL server 40 (e.g., in block 160), the APAL debugging tool 48 may display the received output from executing and debugging the APAL application 44. For example, the APAL debugging tool 48 may display a portion of the received debugging output (e.g., event data) in the event section 96 of the user interface 90 illustrated in FIG. 4. Additionally, the APAL debugging tool 48 may display a portion of the received debugging output (e.g., final variable values) in the variable section 92 of the user interface 90. Furthermore, if the operator selects the trend button 118 of the user interface 90, the APAL debugging tool 48 may present the operator with charts or graphs illustrating trends in the values of the monitored variables from the execution and debugging of the application 44. Further, in certain embodiments, the APAL debugging tool 48 may store (block 166) the outputs from executing and debugging the APAL application 44 (e.g., in memory 64 or NV storage 66) for later access.

The technical effects of the present approach include enabling the debugging of L2SCP applications of a L2SCP server (e.g., an APAL server and/or OPC UA server) from a separate client system. Accordingly, embodiments enable communication between the presently disclosed debugging tool (e.g., executing on the client systems) and the L2SCP server (e.g., the OPC UA server executing on the APAL server) using a modified OPC UA protocol that includes a framework for exchanging debugging instructions and information (e.g., debugging extensions). Further, presently disclosed embodiments provide a normalized debugging API, which may be used by a programmer to define properties (e.g., variables and/or methods) of an application that may be monitored and/or controlled by the operator from the disclosed debugging tool. As such, the operator need not be intimately familiar with the internals of the application in order to perform the debugging process set forth above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a client system comprising a memory and a processor configured to execute a debugging tool, wherein the debugging tool is communicatively coupled to an Object Linking and Embedding for Process Control Unified Architecture (OPC UA) server, wherein the debugging tool is configured to monitor and control, from the client system, debugging of an application executing on the OPC UA server, and wherein the debugging tool is configured to communicate with the OPC UA server using a modified OPC UA protocol that includes debugging extensions.

2. The system of claim 1, wherein the debugging tool comprises a user interface configured to receive one or more selections to be used when debugging the application.

3. The system of claim 2, wherein the one or more selections comprise one or more variables of the application to be monitored when debugging the application.

4. The system of claim 3, wherein the user interface is configured to provide a table that indicates values associated with the one or more variables of the application throughout the debugging of the application.

5. The system of claim 2, wherein the one or more selections comprise one or more methods of the application to activate or deactivate when debugging the application.

6. The system of claim 2, wherein the user interface is configured to present information received from the OPC UA server regarding the debugging of the application executing on the OPC UA server.

7. The system of claim 1, wherein the client system is configured to communicate with the OPC UA server using an OPC UA protocol.

8. The system of claim 1, comprising the OPC UA server having a second memory and a second processor configured to execute the application, wherein the OPC UA server is configured to receive one or more selections from the debugging tool, the OPC UA server is configured to execute the application using the received one or more selections, and the OPC UA server is configured to provide the client system with one or more details regarding the debugging of the application executing on the OPC UA server.

9. The system of claim 1, wherein the application is configured to implement a normalized debugger application programming interface (API), wherein the normalized debugger API is configured to provide a collection of methods that enable the debugging tool to monitor and control the debugging of the application executing on the OPC UA server.

10. A method, comprising:
instructing, from a client system, a Level 2 Supervisory Control Platform (L2SCP) server to execute and debug a L2SCP application based on one or more received selections, wherein the client system and the L2SCP server are configured to communicate using a modified Object Linking and Embedding for Process Control Unified Architecture (OPC UA) protocol having debugging extensions;
receiving, at the client system, output from the L2SCP server regarding the execution and debugging of the L2SCP application, wherein the output comprises event details and variable values related to the execution and debugging of the L2SCP application; and
displaying and storing, at the client system, the received output from the execution and debugging of the L2SCP application.

11. The method of claim 10, comprising receiving, at the client system, one or more selections of variables of the L2SCP application for monitoring during the execution and debugging of the L2SCP application.

12. The method of claim 10, comprising receiving, at the client system, one or more selections of methods of the L2SCP application for activation or deactivation during the execution and debugging of the L2SCP application.

13. The method of claim 10, comprising executing and debugging the L2SCP application, via the L2SCP server, based on the one or more selections received at the client system.

14. The method of claim 10, comprising halting the execution and debugging of the L2SCP application when instructions are received, at the client system, to halt the execution and debugging of the L2SCP application by the L2SCP server, or when an unrecoverable error has occurred during the execution and debugging of the L2SCP application by the L2SCP server, or when execution and debugging of the L2SCP application has been completed by the L2SCP server.

15. The method of claim 10, wherein the L2SCP application is configured to use a normalized debugger application programming interface (API) configured to enable the debugging tool to monitor and control the debugging of the L2SCP application.

16. A tangible, non-transitory, computer-readable medium storing a plurality of instructions executable by a processor of an electronic device, the instructions comprising:
instructions to present a user interface of a debugging tool, wherein the user interface is configured to receive selections for use in debugging an application, wherein the application is configured to be debugged by an Object Linking and Embedding for Process Control Unified Architecture (OPC UA) server of an Level 2 Supervisory Control Platform (L2SCP) server based on the selections;
instructions to instruct the OPC UA server, using a modified OPC UA protocol, to debug the application, wherein the modified OPC UA protocol includes debugging extensions and is configured to enable communication between the debugging tool and the OPC UA server;
instructions to receive from the OPC UA server, using the modified OPC UA protocol, output related to the debugging of the application; and
instructions to display the received output related to the debugging of the application via the user interface of the debugging tool.

17. The medium of claim 16, wherein the debugging tool is configured to request, receive, and authenticate security credentials before instructing the OPC UA server to debug the application.

18. The medium of claim 16, wherein the application is configured to implement a normalized debugger application programming interface (API), wherein the normalized debugger API is configured to provide a collection of methods that enable the debugging tool to monitor and control the debugging of the application by the OPC UA server.

* * * * *